United States Patent
Hall, Jr. et al.

[11] Patent Number: 6,078,351
[45] Date of Patent: Jun. 20, 2000

[54] PROJECTION TELEVISIONS WITH THREE DIMENSIONAL HOLOGRAPHIC SCREENS

[75] Inventors: Estill Thone Hall, Jr., Fishers; Wendy Rene Pfile, Indianapolis, both of Ind.

[73] Assignee: Thomson Consumer Electronics, Inc., Indianapolis, Ind.

[21] Appl. No.: 08/777,887

[22] Filed: Dec. 31, 1996

[51] Int. Cl.[7] .............................. H04N 5/89; H04N 15/00
[52] U.S. Cl. ................. 348/40; 348/41; 348/51; 345/6; 345/419; 359/455
[58] Field of Search .................. 348/51, 42, 40, 348/41, 144, 52, 744, 752, 746, 781, 37; 359/455, 456, 458, 60; 345/6, 206, 419, 424, 425; H04N 5/89

[56] References Cited

U.S. PATENT DOCUMENTS

| | | | |
|---|---|---|---|
| 3,625,584 | 12/1971 | Daniel | 350/127 |
| 4,004,093 | 1/1977 | Oland | 358/60 |
| 4,032,968 | 6/1977 | Miyoshi et al. | 358/60 |

(List continued on next page.)

FOREIGN PATENT DOCUMENTS

| | | | |
|---|---|---|---|
| 0 349 884 A2 | 1/1990 | European Pat. Off. | G02B 5/32 |
| 0 349 947 A2 | 1/1990 | European Pat. Off. | G02B 5/02 |
| 0463888 | 1/1992 | European Pat. Off. | G02B 5/32 |
| 0 479 490 A2 | 4/1992 | European Pat. Off. | G02B 5/32 |
| 0 484 073 A2 | 5/1992 | European Pat. Off. | G03B 21/62 |
| 0 629 899 A1 | 12/1994 | European Pat. Off. | G03B 21/62 |
| 0 671 653 A1 | 9/1995 | European Pat. Off. | G03B 21/62 |
| 0 676 902 A2 | 10/1995 | European Pat. Off. | H04N 9/31 |
| 4-136885 | 5/1992 | Japan | G03H 1/26 |
| 5-53195 | 3/1993 | Japan | G03B 21/00 |
| 6-82625 | 3/1994 | Japan | G02B 5/32 |
| 8-292498 | 11/1996 | Japan | G03B 21/62 |
| 9-73132 | 3/1997 | Japan | G03B 21/62 |

(List continued on next page.)

OTHER PUBLICATIONS

International Search Report for counterpart international application number PCT/ US 97/ 22782.
International Search Report for related international application number PCT/ US98/ 01735.
International Search Report for related international application number PCT/ US 98/ 01751.
International Search Report for related international application number PCT/ US 98/ 01616.
International Search Report for related international application number PCT/ US 98/ 01617.

*Primary Examiner*—Howard Britton
*Assistant Examiner*—Tung Vo
*Attorney, Agent, or Firm*—Joseph S. Tripoli; Joseph J. Laks; Harvey D. Fried

[57] ABSTRACT

A projection television comprises a projection screen formed by a three dimensional hologram disposed on a film substrate. A projection tube has an optical path in a substantially orthogonal orientation with the screen and two other projection tubes have respective optical paths converging toward the first optical path at angles of incidence $\alpha$. The hologram has a configuration effective for reducing color shift in the displayed images. The screen has a color shift less than or equal to approximately 5 for all angles $\alpha$, where $0° < \alpha \leq 30°$, as determined by the maximum value obtained from at least one of the following expressions:

$$C(\theta) = 20 \cdot \log_{10}\left(\frac{red(\theta)}{blue(\theta)}\right); \text{ and,}$$

$$C(\theta) = 20 \cdot \log_{10}\left(\frac{green(\theta)}{blue(\theta)}\right),$$

where $\theta$ is any angle within a range horizontal viewing angles, $C(\theta)$ is the color shift at angle $\theta$, $red(\theta)$ is the red luminance level at angle $\theta$, $blue(\theta)$ is the blue luminance level at angle $\theta$ and $green(\theta)$ is the green luminance level at angle $\theta$.

24 Claims, 1 Drawing Sheet

U.S. PATENT DOCUMENTS

| | | | | |
|---|---|---|---|---|
| 4,130,337 | 12/1978 | Okoshi | ................... | 350/3.76 |
| 4,219,843 | 8/1980 | Takahashi | ................... | 358/60 |
| 4,374,609 | 2/1983 | Lange | ................... | 350/128 |
| 4,443,814 | 4/1984 | Mori | ................... | 358/60 |
| 4,520,387 | 5/1985 | Cortillini | ................... | 358/90 |
| 4,536,056 | 8/1985 | Oguino | ................... | 350/128 |
| 4,556,913 | 12/1985 | VanBreemen et al. | ................... | 358/237 |
| 4,566,756 | 1/1986 | Heijinemans | ................... | 350/126 |
| 4,752,116 | 6/1988 | Sekiguchi | ................... | 350/128 |
| 5,046,793 | 9/1991 | Hockley et al. | ................... | 359/12 |
| 5,196,960 | 3/1993 | Matsuzaki | ................... | 359/453 |
| 5,206,761 | 4/1993 | Ogino | ................... | 359/457 |
| 5,241,416 | 8/1993 | Mitsutake | ................... | 359/456 |
| 5,257,130 | 10/1993 | Monroe | ................... | 359/478 |
| 5,576,853 | 11/1996 | Molteni | ................... | 359/12 |
| 5,613,748 | 3/1997 | Yoshida et al. | ................... | 353/74 |
| 5,760,850 | 6/1998 | Nakanishi et al. | ................... | 349/5 |

FOREIGN PATENT DOCUMENTS

| | | | | |
|---|---|---|---|---|
| 9-73133 | 3/1997 | Japan | ................... | G03B 21/62 |
| 9-113995 | 5/1997 | Japan | ................... | G03B 21/10 |
| 9-114354 | 5/1997 | Japan | ................... | G03H 1/22 |
| 92/09918 | 6/1992 | WIPO | ................... | G03B 21/10 |
| 95-04303 | 2/1995 | WIPO | ................... | G03B 21/60 |
| 95/34832A1 | 12/1995 | WIPO | ................... | G02B 5/32 |
| 96/07953A1 | 3/1996 | WIPO | ................... | G03B 21/62 |
| 96-31803 | 10/1996 | WIPO | ................... | G03B 21/62 |
| 97/10523A1 | 3/1997 | WIPO | ................... | G02B 5/32 |

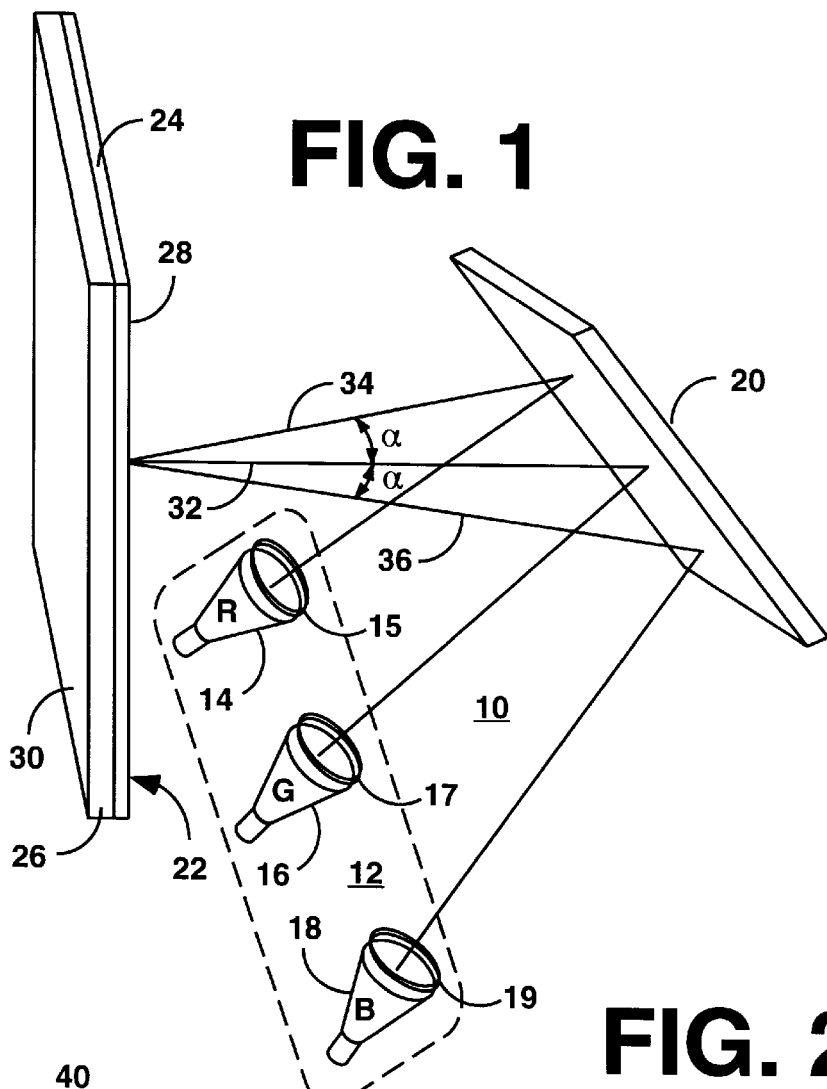
FIG. 1
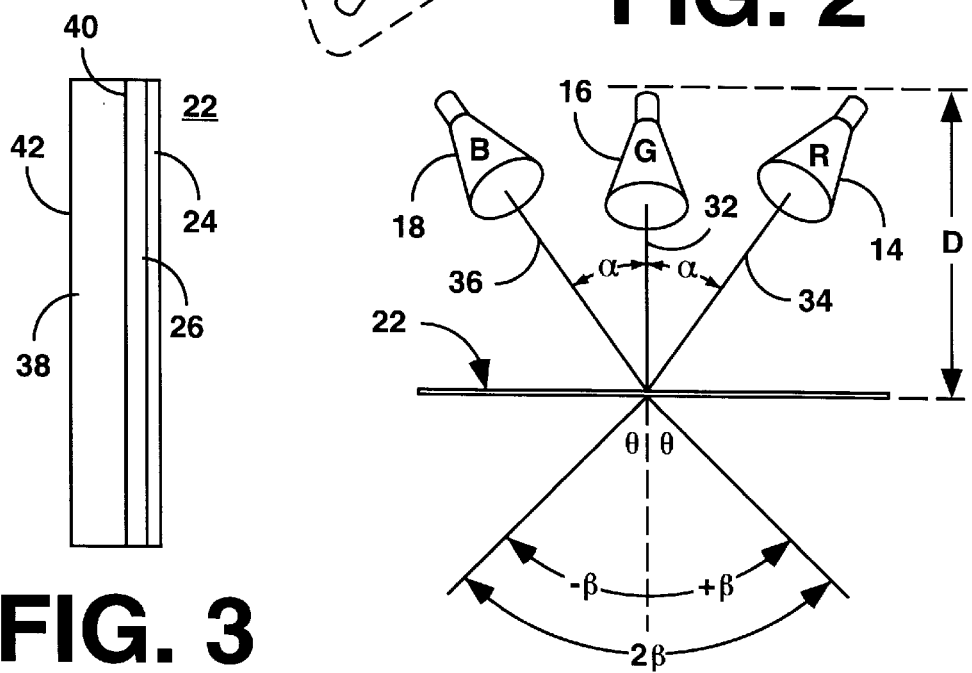
FIG. 3
FIG. 2

PROJECTION TELEVISIONS WITH THREE DIMENSIONAL HOLOGRAPHIC SCREENS

BACKGROUND OF THE INVENTION

1. Field of the Invention

This invention relates generally to the field of projection television receivers, and in particular, to projection television receivers having screens providing significantly reduced color shift and/or significantly reduced cabinet depth.

2. Description of Related Art

Color shift is defined as the change in the red/blue or green/blue ratio of a white image formed at the center of a projection screen by projected images from red, green and blue projection tubes, when viewed at different angles in the horizontal plane, by observations made at the peak brightness vertical viewing angle.

The color shift problem is caused by the need for at least three image projectors for respective images of different colors, for example, red, blue and green. A projection screen receives images from the at least three projectors on a first side and displays the images on a second side with controlled light dispersion of all the displayed images. One of the projectors, usually green and usually in the center of an array of projectors, has a first optical path in a substantially orthogonal orientation with the screen. At least two of the projectors, usually red and blue and usually positioned on opposite sides of the central green projector in the array, have respective optical paths converging toward the first optical path in a non orthogonal orientation defining angles of incidence. Color shift results from the non orthogonal relationship of the red and blue projectors, relative to the screen and to the green projector. As a result of the color shift, color tones may differ at every position on the screen. The condition in which the color tone difference is large is often referred to as poor white uniformity. The smaller the color shift, the better the white uniformity.

Color shift is denoted by a scale of numbers, in which lower numbers indicate less color shift and better white uniformity. In accordance with a common procedure, values for the red, green and blue luminance are measured at the screen center from a variety of horizontal viewing angles, typically from at least about −40° to +40°, to as much as about −60° to +60°, in 5° or 10° increments. The positive and negative angles represent horizontal viewing angles to the right and left of screen center, respectively. These measurements are taken at the peak vertical viewing angle. The red, green and blue data is normalized to unity at 0°. One or both of the following equations (I) and (II) are evaluated at each angle:

$$C(\theta) = 20 \cdot \log_{10}\left(\frac{red(\theta)}{blue(\theta)}\right); \text{ and,} \quad \text{(I)}$$

$$C(\theta) = 20 \cdot \log_{10}\left(\frac{green(\theta)}{blue(\theta)}\right), \quad \text{(II)}$$

where θ is any angle within a range horizontal viewing angles, C(θ) is the color shift at angle θ, red(θ) is the red luminance level at angle θ, blue(θ) is the blue luminance level at angle θ and green(θ) is the green luminance level at angle θ. The maximum of these values is the color shift of the screen.

In general, color shift should be no larger than 5, nominally, on any commercially acceptable screen design. Other engineering and design constraints may sometimes require that the color shift be somewhat higher than 5, although such color shift performance is not desirable and usually results in a perceptibly inferior picture with poor white uniformity.

Screens for projection television receivers are generally manufactured by an extrusion process utilizing one or more patterned rollers to shape the surface of a thermoplastic sheet material. The configuration is generally an array of lenticular elements, also referred to as lenticules and lenslets. The lenticular elements may be formed on one or both sides of the same sheet material or on one side only of different sheets which can then be permanently combined as a laminated unit or otherwise mounted adjacent to one another so as to function as a laminated unit. In many designs, one of the surfaces of the screen is configured as a Fresnel lens to provide light diffusion. Prior art efforts to reduce color shift and improve white uniformity have focused exclusively on two aspects of the screen. One aspect is the shape and disposition of the lenticular elements. The other aspect is the extent to which the screen material, or portions thereof, are doped with light diffusing particles to control light diffusion. These efforts are exemplified by the following patent documents.

In U.S. Pat. Nos. 4,432,010 and 4,536,056, a projection screen includes a light-transmitting lenticular sheet having an input surface and an exit surface. The input surface is characterized by horizontally diffusing lenticular profiles having a ratio of a lenticulated depth Xv to a close-axis-curvature radius R1(Xv/R1) which is within the range of 0.5 to 1.8. The profiles are elongated along the optical axis and form aspherical input lenticular lenses.

The use of a screen with a double sided lenticular lens is common. Such a screen has cylindrical entrance lenticular elements on an entrance surface of the screen, cylindrical lenticular elements formed on an exit surface of the screen and a light absorbing layer formed at the light non convergent part of the exit surface. The entrance and the exit lenticular elements each have the shape of a circle, ellipse or hyperbola represented by the following equation (III):

$$Z(x) = \frac{Cx^2}{1 + [1 - (K+1)C^2x^2]^{\frac{1}{2}}} \quad \text{(III)}$$

wherein C is a main curvature and K is a conic constant. Alternatively, the lenslets have a curve to which a term with a higher order than 2nd order has been added.

In screens making use of such a double sided lenticular lens, it has been proposed to specify the position relationship between the entrance lens and exit lens, or the lenticular elements forming the lenses. It has been taught, for example in U.S. Pat. No. 4,443,814, to position the entrance lens and exit lens in such a way that the lens surface of one lens is present at the focal point of the other lens. It has also been taught, for example in JP 58-59436, that the eccentricity of the entrance lens be substantially equal to a reciprocal of the refractive index of the material constituting the lenticular lens. It has further been taught, for example in U.S. Pat. No. 4,502,755, to combine two sheets of double-sided lenticular lenses in such a way that the optic axis planes of the respective lenticular lenses are at right angles with respect to one another, and to form such double sided lenticular lenses in such a way that the entrance lens and exit lens at the periphery of one of the lenses are asymmetric with respect to the optic axis. It is also taught, in U.S. Pat. No. 4,953,948, that the position of light convergence only at the valley of an entrance lens should be offset toward the viewing side from the surface of an exit lens so that the tolerance for misalignment of optic axes and the difference in thickness can be made larger or the color shift can be made smaller.

In addition to the various proposals for decreasing the color shift or white non uniformity, other proposals for improving projection screen performance are directed to brightening pictures and ensuring appropriate visual fields in both the horizontal and vertical directions. Such techniques are not of direct interest and are not described in detail. A summary of many such proposals can be found in U.S. Pat. No. 5,196,960, which itself teaches a double sided lenticular lens sheet comprising an entrance lens layer having an entrance lens, and an exit lens layer having an exit lens whose lens surface is formed at the light convergent point of the entrance lens, or in the vicinity thereof, wherein the entrance lens layer and the exit lens layer are each formed of a substantially transparent thermoplastic resin and at least the exit layer contains light diffusing fine particles and wherein a difference exists in the light diffusion properties between the entrance lens layer and the exit lens layer. A plurality of entrance lenses comprise a cylindrical lens. The exit lens is formed of a plurality of exit lens layers, each having a lens surface at the light convergent point of each lens of the entrance lens layer, or in the vicinity thereof. A light absorbing layer is also formed at the light non convergent part of the exit lens layer. This screen design is said to provide sufficient horizontal visual field angle, decreased color shift and a brighter picture, as well as ease of manufacture by extrusion processes.

Despite many years of aggressive developments in projection screen design, the improvements have been incremental, at best. Moreover, there has been no success in surpassing certain benchmarks. The angle of incidence defined by the geometric arrangement of the image projectors, referred to as angle α herein, has generally been limited to the range of greater than 0° and less than or equal to about 10° or 11°. The size of the image projectors makes angles of α close to 0° essentially impossible. In the range of the angles of α less than about 10° or 11°, the best color shift performance which has been achieved is about 5, as determined in accordance with equations (I) and (II). In the range of the angles of α greater than about 10° or 11°, the best color shift performance which has been achieved is not commercially acceptable. In fact, projection television receivers having angles of α greater than 10° or 11° are not known.

Small angles of α have a significant and undesirable consequence, namely the very large cabinet depth needed to house a projection television receiver. The large depth is a direct result of the need to accommodate optical paths having small angles of incidence (α). Techniques for reducing the size of projection television cabinets generally rely on arrangements of mirrors. Such efforts are also ultimately limited by the small range of angles of incidence.

Polaroid Corporation sells a photo polymer designated DMP-128®, which Polaroid Corporation can manufacture as a three dimensional hologram, using proprietary processes. The holographic manufacturing process is described, in part, in U.S. Pat. No. 5,576,853. A three dimensional holographic screen for a projection television was proposed by Polaroid Corporation, as one of many suggestions made during efforts to establish a market for the DMP-128® photo polymer holographic product. The proposal was based on advantages which Polaroid Corporation expected in terms of higher brightness and resolution, lower manufacturing cost, lower weight, and resistance to the abrasion to which two-piece screens are subjected during shipping. Polaroid Corporation never proposed any particular holographic configuration for the volume holographic elements which might make up such a holographic projection television screen, and never even considered the problem of color shift in projection television screens of any type, holographic or otherwise.

Overall, despite years of intensive development to provide a projection television receiver having a screen with a color shift less than 5, even significantly less than 5, or having a color shift as low as 5 for angles of α even greater than 10° or 11°, there have been no advances in solving the color shift problem other than incremental changes in the shapes and positions of lenticular elements and diffusers in conventional projection screens. Moreover, despite suggestions that three dimensional holograms might be useful for projection screens, although for reasons having nothing to do with color shift, there has been no effort to provide projection televisions with three dimensional holographic screens. A long felt need for a projection television receiver having significantly improved color shift performance, which can also be built into a significantly smaller cabinet, has remained unsatisfied.

SUMMARY OF THE INVENTION

A projection television receiver in accordance with the inventive arrangements taught herein provides such a significant improvement in color shift performance, measured in orders of magnitude, that a color shift of 2 or less can be achieved with projection television receivers having angles of incidence α in the range of less than 10° or 11°. Moreover, the color shift performance is so significant that commercially acceptable projection television receivers having angles of incidence up to about 30° can be provided, in much smaller cabinets. The color shift performance of such large α angle receivers is at least as good as conventional small α angle receivers, for example having a color shift of 5, and can be expected to approach or even reach values as low as about 2, as in the small α angle receivers.

These results are achieved by forsaking the extruded lens screen technology altogether. Instead, a projection television receiver in accordance with an inventive arrangement has a screen formed by a three dimensional hologram formed on a substrate, for example, a polyethylene film, such as Mylar®.

Such a three dimensional holographic screen was originally developed for its expected advantages in terms of higher brightness and resolution, and lower manufacturing cost, lower weight and resistance to abrasion to which two-piece screens are subjected, for example during shipping. The discovery of the color shift performance of the three dimensional holographic screen came about when testing to determine if the optical properties of the three dimensional screen would be at least as good as a conventional screen. The color shift performance of the three dimensional holographic screen, as measured by equations (I) and (II), was so unexpectedly low as to be shocking. The barriers which limited prior art improvements to incremental steps had been eliminated altogether. Moreover, smaller cabinets with projection geometry characterized by larger α angles of incidence can now be developed.

A projection television having the unexpected properties associated with three dimensional holographic screens, and in accordance with the inventive arrangements taught herein, comprises: at least three image projectors for respective images of different colors; a projection screen formed by a three dimensional hologram disposed on a substrate, the screen receiving images from the projectors on a first side and displaying the images on a second side with controlled light dispersion of all the displayed images; one of the projectors having a first optical path in a substantially orthogonal orientation with the screen and at least two of the projectors having respective optical paths converging toward the first optical path in a non orthogonal orientation defining angles of incidence; and, the three dimensional hologram having a configuration effective for reducing color shift in the displayed images, the screen having a color shift less than or equal to approximately 5 for all the angles of incidence in a range greater than 0° and less than or equal to approximately 30°, as determined by the maximum value obtained from at least one of the following expressions:

$$C(\theta) = 20 \cdot \log_{10}\left(\frac{red(\theta)}{blue(\theta)}\right); \text{ and,}$$

$$C(\theta) = 20 \cdot \log_{10}\left(\frac{green(\theta)}{blue(\theta)}\right),$$

where θ is any angle within a range horizontal viewing angles, C(θ) is the color shift at angle θ, red(θ) is the red luminance level at angle θ, blue(θ) is the blue luminance level at angle θ and green(θ) is the green luminance level at angle θ. The color shift of the screen can be expected to be less than 5, for example, less than or equal to approximately 4, 3 or even 2.

In terms of the known barrier at an angle of incidence of about 10° or 11°, the color shift of the screen is less than or equal to approximately 2 for all the angles of incidence in a first subrange of angles of incidence greater than 0° and less than or equal to approximately 10°; and, the color shift of the screen is less than or equal to approximately 5 for all the angles of incidence in a second subrange of angles of incidence greater than approximately 10° and less than or equal to approximately 30°.

The screen further comprises a light transmissive reinforcing member, for example, of an acrylic material in a layer having a thickness in the range of approximately 2–4 mm. The substrate comprises a highly durable, transparent, water-repellent film, such as a polyethylene terephthalate resin film. The substrate can be a film having a thickness in the range of about 1–10 mils. A thickness of about 7 mils has been found to provide adequate support for the three dimensional hologram. The thickness of the film is not related to performance. The three dimensional hologram has a thickness in the range of not more than approximately 20 microns.

The projection television may further comprise one or more mirrors between the image projectors and the screen.

BRIEF DESCRIPTION OF THE DRAWINGS

FIG. 1 is a diagrammatic representation of a projection television in accordance with the inventive arrangements taught herein.

FIG. 2 is a simplified diagram of projection television geometry useful for explaining the inventive arrangements.

FIG. 3 is a side elevation of a reinforced projection screen according to the inventive arrangements.

DETAILED DESCRIPTION OF THE PREFERRED EMBODIMENTS

A projection television receiver 10 is illustrated diagrammatically in FIG. 1. An array 12 of projection cathode ray tubes 14, 16 and 18 provide red, green and blue images respectively. The cathode ray tubes are provided with respective lenses 15, 17 and 19. The projected images are reflected by a mirror 20 onto a projection screen 22. Additional mirrors can also be utilized, depending on the particular geometry of the optical paths or axes. The green cathode ray tube 16 projects the green image along an optical path axis 32, which has a substantially orthogonal orientation with screen 22. In other words, the optical path axis is at right angles to the screen. The red and blue cathode ray tubes have respective optical paths axis 34 and 36, which converge toward the first optical path axis 32 in a non orthogonal orientation defining angles of incidence α. The angles of incidence introduce the problem of color shift.

The screen 22 comprises a three dimensional hologram 26 disposed on a substrate 24. The screen receives images from the projectors on a first, entrance surface side 28 and displays the images on a second, exit surface side 30, with controlled light dispersion of all the displayed images. The substrate is preferably a highly durable, transparent, water-repellent film, such as a polyethylene terephthalate resin film. One such film is available from E. I. du Pont de Nemours & Co. under the trademark Mylar®. The film substrate has a thickness in the range of about 1–10 mils, equivalent to about 0.001–0.01 inches or about 25.4–254 microns. A film having a thickness of about 7 mils has been found to provide adequate support for the three dimensional hologram disposed thereon. The thickness of the film does not affect screen performance in general or color shift performance in particular, and films of different thickness may be utilized. The three dimensional hologram 26 has a thickness of not more than approximately 20 microns.

Three dimensional holographic screens are available from at least two sources. Polaroid Corporation utilizes a proprietary, wet chemical process to form three dimensional holograms in its DMP-128 photo polymer material.

A preferred embodiment of the three dimensional holographic screens used in the projection television receivers described and claimed herein were manufactured by the Polaroid Corporation wet chemical process, in accordance with the following performance specifications:

| Horizontal half viewing angle : | 38° ± 3°, |
|---|---|
| Vertical half viewing angle : | 10° ± 1°, |
| Screen gain : | ≧8, |
| Color shift : | ≦3, | where the horizontal and vertical viewing angles are measured conventionally, screen gain is the quotient of light intensity directed from the source toward the rear of the viewing surface, and light intensity from the front of the viewing surface toward the viewer, measured orthogonal to the screen, and color shift is measured as described above.

The extraordinary color shift performance of the three dimensional holographic projection screen was, as explained in the Summary of the Invention, wholly unexpected.

FIG. 2 is a simplified projection television diagram, omitting the mirror and lenses, for explaining color shift performance. The optical axes 34 and 36 of the red and blue cathode ray tubes 14 and 18 are aligned symmetrically at angles of incidence α with respect to the optical axis 32 of the green cathode ray tube 16. The minimum depth D of a cabinet is determined by the distance between the screen 22 and the rear edges of the cathode ray tubes. It will be appreciated that as the angle α becomes smaller, the cathode tubes move closer together, and must be spaced further from the screen to avoid hitting one another. At a sufficiently small angle α, such interference cannot be avoided. This undesirably increases the minimum depth D of a cabinet. Conversely, as the angle α gets larger, the cathode ray tubes can be moved closer to the screen 22, reducing the minimum depth D of a cabinet.

On the viewing side of the screen 22, two horizontal half viewing angles are designated −β and +β. Together, a total horizontal viewing angle of 2β is defined. The half viewing angles may typically range from ±40° to ±60°. Within each half angle are a plurality of specific angles θ, at which color shift can be measured and determined, in accordance with equations (I) and (II) explained above.

In terms of the known barrier at an angle of incidence of about 10° or 11°, the color shift of the three dimensional holographic screen is less than or equal to approximately 2 for all the angles of incidence in a first subrange of angles of incidence greater than 0° and less than or equal to approximately 10°; and, the color shift of the screen is less than or equal to approximately 5 for all the angles of incidence in a second subrange of angles of incidence greater than approximately 10° and less than or equal to approximately 30°. It is expected that a color shift of less than or equal to approximately 2, as in the first subrange, can also be achieved in the second subrange of larger angles of incidence.

With reference to FIG. 3, the substrate 24 comprises a transparent film, such as Mylar®, as described above. The photo polymer material from which the three dimensional hologram 26 is formed is supported on the film layer 24. A suitable photo polymer material is DMP-128®.

The screen 22 may further comprise a light transmissive reinforcing member 38, for example, of an acrylic material, such as polymethylmethacrylate (PMMA). Polycarbonate materials can also be used. The reinforcing member 38 is presently a layer having a thickness in the range of approximately 2–4 mm. The screen 22 and the reinforcing member are adhered to one another throughout the mutual boundary 40 of the holographic layer 26 and the reinforcing member 38. Adhesive, radiation and/or thermal bonding techniques may be utilized. The surface 42 of the reinforcing layer may also be treated, for example by one or more of the following: tinting, anti-glare coatings and anti-scratch coatings.

Various surfaces of the screen and/or its constituent layers may be provided with other optical lenses or lenticular arrays to control aspects of the projection screen bearing on performance characteristics other than color shift performance, as is known to do with conventional projection screens, without impairing the improved color shift performance of the three dimensional holographic projection screen.

What is claimed is:

1. A projection television, comprising:
    at least three image projectors for respective images of different colors;
    a projection screen formed by a three dimensional hologram disposed on a substrate, said screen receiving images from said projectors on a first side and displaying said images on a second side, said three dimensional hologram providing controlled light dispersion of all said displayed images;
    one of said projectors having a first optical axis in a substantially orthogonal orientation with said screen and at least two of said projectors having respective optical axes converging toward said first optical axis in a non orthogonal orientation defining angles of incidence (α); and,
    said three dimensional hologram representing a three dimensional array of lenticular elements having a configuration effective for reducing color shift in said displayed images, said screen having a color shift less than or equal to approximately 5 for all said angles of incidence in a range greater than 0° and less than or equal to approximately 30°, as determined by the maximum value obtained from at least one of the following expressions:

$$C(\theta) = 20 \cdot \log_{10}\left(\frac{red(\theta)}{blue(\theta)}\right); \text{ and,}$$

$$C(\theta) = 20 \cdot \log_{10}\left(\frac{green(\theta)}{blue(\theta)}\right),$$

where θ is any angle within a range horizontal viewing angles, C(θ) is the color shift at angle θ, red(θ) is the red luminance level at angle θ, blue(θ) is the blue luminance level at angle θ and green(θ) is the green luminance level at angle θ.

2. The projection television of claim 1, wherein the color shift of said screen is less than or equal to approximately 4 for all said angles of incidence.

3. The projection television of claim 1, wherein the color shift of said screen is less than or equal to approximately 3 for all said angles of incidence.

4. The projection television of claim 1, wherein the color shift of said screen is less than or equal to approximately 2 for all said angles of incidence.

5. The projection television of claim 1, wherein:
    the color shift of said screen is less than or equal to approximately 2 for all said angles of incidence in a first subrange of angles of incidence greater than 0° and less than or equal to approximately 10°; and,
    the color shift of said screen is less than or equal to approximately 5 for all said angles of incidence in a second subrange of angles of incidence greater than approximately 10° and less than or equal to approximately 30°.

6. The projection television of claim 1, wherein said screen further comprises a light transmissive reinforcing member.

7. The projection television of claim 6, wherein said screen further comprises an acrylic, light transmissive reinforcing member.

8. The projection television of claim 1, wherein said substrate comprises a highly durable, transparent, water-repellent film.

9. The projection television of claim 8, wherein said substrate comprises a polyethylene terephthalate resin film.

10. The projection television of claim 8, wherein said substrate comprises a film having a thickness in the range of approximately 1–10 mils.

11. The projection television of claim 1, wherein said three dimensional hologram comprises a photo polymer material disposed on said substrate.

12. The projection television of claim 6, wherein said three dimensional hologram comprises a photo polymer material disposed on said substrate.

13. The projection television of claim 7, wherein said three dimensional hologram comprises a photo polymer material disposed on said substrate.

14. The projection television of claim 8, wherein said three dimensional hologram comprises a photo polymer material disposed on said substrate.

15. The projection television of claim 9, wherein said three dimensional hologram comprises a photo polymer material disposed on said substrate.

16. The projection television of claim 10, wherein said three dimensional hologram comprises a photo polymer material disposed on said substrate.

17. The projection television of claim 1, further comprising a mirror between said image projectors and said screen.

18. The projection television of claim 1, in which said three-dimensional hologram has the following performance specifications:

| | |
|---|---|
| Horizontal half viewing angle : | 38° ± 3° |
| Vertical half viewing angle : | 10° ± 1° |
| Screen gain : | ≧8 |
| Color shift : | ≦3. |

19. A projection television, comprising:

at least three image projectors for respective images of different colors;

a projection screen formed by one three dimensional hologram disposed on a substrate, said screen receiving images from said projectors on a first side and displaying said images on a second side, said three dimensional hologram providing controlled light dispersion of all said respective images of different colors from said at least three image projectors;

one of said projectors having a first optical axis in a substantially orthogonal orientation with said screen and at least two of said projectors having respective optical axes converging toward said first optical axis in a non orthogonal orientation defining angles of incidence (α); and, said three dimensional hologram having a configuration effective for reducing color shift in all of said displayed images of different colors, said screen having a color shift less than or equal to approximately 5 for all said angles of incidence in a range greater than 0° and less than or equal to approximately 30°, as determined by the maximum value obtained from at least one of the following expressions:

$$C(\theta) = 20 \cdot \log_{10}\left(\frac{red(\theta)}{blue(\theta)}\right); \text{ and,}$$

$$C(\theta) = 20 \cdot \log_{10}\left(\frac{green(\theta)}{blue(\theta)}\right),$$

where θ is any angle within a range horizontal viewing angles, C(θ) is the color shift at angle θ, red(θ) is the red luminance level at angle θ, blue(θ) is the blue luminance level at angle θ and green(θ) is the green luminance level at angle θ.

20. The projection television of claim 19, wherein the color shift of said screen is less than or equal to approximately 4 for all said angles of incidence.

21. The projection television of claim 19, wherein the color shift of said screen is less than or equal to approximately 3 for all said angles of incidence.

22. The projection television of claim 19, wherein the color shift of said screen is less than or equal to approximately 2 for all said angles of incidence.

23. The projection television of claim 19, wherein:

the color shift of said screen is less than or equal to approximately 2 for all said angles of incidence in a first subrange of angles of incidence greater than 0° and less than or equal to approximately 10°; and, the color shift of said screen is less than or equal to approximately 5 for all said angles of incidence in a second subrange of angles of incidence greater than approximately 10° and less than or equal to approximately 30°.

24. The projection television of claim 19, in which said three dimensional hologram has the following performance specifications:

| | |
|---|---|
| Horizontal half viewing angle : | 38° ± 3° |
| Vertical half viewing angle : | 10° ± 1° |
| Screen gain : | ≧8 |
| Color shift : | ≦3. |

* * * * *